United States Patent [19]

Sliwka

[11] Patent Number: 4,898,696

[45] Date of Patent: Feb. 6, 1990

[54] CONTINUOUS PREPARATION OF MICROCAPSULES WITH MELAMINE-FORMALDEHYDE CONDENSATE WALLS IN AQUEOUS DISPERSION

[75] Inventor: Wolfgang Sliwka, Weinheim, Fed. Rep. of Germany

[73] Assignee: BASF Aktiengesellschaft, Ludwigshafen, Fed. Rep. of Germany

[21] Appl. No.: 185,265

[22] Filed: Apr. 18, 1988

Related U.S. Application Data

[63] Continuation of Ser. No. 902,589, Sep. 2, 1986, abandoned.

[30] Foreign Application Priority Data

Sep. 14, 1985 [DE] Fed. Rep. of Germany ....... 3532878

[51] Int. Cl.⁴ .............................................. B01J 13/02
[52] U.S. Cl. .............................. 264/4.7; 428/402.21; 428/914; 503/215
[58] Field of Search ..................... 264/4.7; 428/402.21

[56] References Cited

U.S. PATENT DOCUMENTS 3,993,831  11/1976  Vassiliades ................... 264/4.1 X
4,396,670  8/1983   Sinclair ....................... 264 X/4.7 X
4,406,816  9/1983   Sliwka ......................... 264/4.7 X
4,454,083  6/1984   Brown et al. ................. 264/4.7

FOREIGN PATENT DOCUMENTS 2909906  10/1980  Fed. Rep. of Germany .
1148635  4/1969   United Kingdom .
1392858  4/1975   United Kingdom .
1398044  6/1975   United Kingdom .

*Primary Examiner*—Richard D. Lovering
*Attorney, Agent, or Firm*—Oblon, Spivak, McClelland, Maier & Neustadt

[57] ABSTRACT

Microcapsules having melamine-formaldehyde precondensate capsule walls are prepared in a continuous process in aqueous dispersion starting from an appropriate melamine-formaldehyde precondensate in the presence of a water-soluble high polymer which contains strongly acid groups by further condensing the water-soluble precondensate until the solution starts to become turbid, then dispersing the material to be encapsulated in the resulting dispersion in the presence of the water-soluble high polymer which contains strongly acid groups and subsequently condensing the wall material of the resulting microcapsules to completion.

13 Claims, No Drawings

CONTINUOUS PREPARATION OF MICROCAPSULES WITH MELAMINE-FORMALDEHYDE CONDENSATE WALLS IN AQUEOUS DISPERSION

This application is a continuation of application Ser. No. 06/902,589, filed on Sept. 2, 1986, now abandoned.

In the batchwise preparation of microcapsules of the type used, for example, for reactive carbonless copy papers, the process of dispersing is discontinued when the desired capsule size is reached. This capsule size is determined by viewing a very dilute sample of the reaction mixture under a microscope or, more objectively but also more time-consumingly, by measuring with a suitable optical instrument (for example with a Coulter-Counter). Since the assessment of particle size by microscope contains subjective components, the capsule diameters generally vary somewhat from lot to lot, giving rise to differences in the intensity of the copy and, conversely, in the rub sensitivity of papers prepared therewith. For that reason, but also because of the higher space-time yield, there has been no shortage of attempts to prepare capsules continuously in order thereby to obtain more uniform production conditions and also a narrower distribution of capsule diameters. The capsule diameter can be set and continuously monitored, for example, by measurement with suitable optical instruments.

For instance, German Laid-Open Application DOS 2,333,756 describes a process of continuous encapsulation by means of, for example, gelatin as wall material. German Laid-Open Application DOS 2,909,906 describes another continuous process wherein the wall material is constructed from polyisocyanate, diethylenediamine and diethylenetriamine by means of interface condensation. British Patent No. 1,148,635 likewise describes a continuous process for preparing small capsules, wherein the capsule wall is constructed by means of an interface condensation which leads to crosslinked polyamides, polyesters, polyureas, polycarbonates or polyurethanes.

All these processes have in common that first of all a stable emulsion in water is prepared of, for example, oil droplets whose diameter corresponds to the desired microcapsule diameter, except that the oil droplet diameter is still reversible, and only then is the liquid skin previously formed in, for example, the gelatin process is gelled by temperature reduction and irreversibly consolidated by chemical agents, such as aldehydes, or, as in the case of interface condensates, the second monomer, for example a diamine or triamine, are added to carry out the interface condensation and to finally and irreversibly fix the oil droplet size in the form of the microcapsule.

European Laid-Open Application No. 0,082,635 likewise describes a continuous process for preparing microcapsules. The walls of the microcapsules are formed from melamineformaldehyde precondensates in the presence of anionic polymeric polyelectrolytes which contain 2 carboxyl groups for every 4 to 6 carbon atoms in the polymer chain. In detail, first an emulsion of the water-insoluble liquid core material to be encapsulated is prepared in the presence of the melamine-formaldehyde precondensate and the anionic polymeric polyelectrolyte in an emulsion mill, and then the melamine-formaldehyde precondensate is condensed at elevated temperature in a tubular reactor, the flow rate, the temperature and the length of the tubular reactor being dimensioned in such a way that the precondensate becomes fully condensed. At the end of the tubular reactor, in which the flow should not be turbulent, a dispersion of completed microcapsules is present.

Again this is a process where first only an emulsion of the hydrophobic core material having the final droplet diameter is prepared and only then is the capsule wall formed by polycondensation and consolidated.

The present invention, then, relates to a continuous process for preparing microcapsules having melamine-formaldehyde precondensate capsule walls in aqueous dispersion starting from appropriate melamine-formaldehyde precondensates in the presence of water-soluble high polymers which contain strongly acid groups, which comprises further condensing the water-soluble precondensates until the solution starts to become turbid, then dispersing the material to be encapsulated in the dispersion formed, in the presence of the water-soluble high polymer containing strongly acid groups, and subsequently fully condensing the wall material of the resulting microcapsules.

The process is suitable for the continuous encapsulation of water-insoluble hydrophobic materials, in particular hydrophobic liquids. Such liquids are for example alkylnaphthalenes, partially hydrogenated terphenyls, aromatic hydrocarbons, such as xylene, toluene or dodecylbenzene, aliphatic hydrocarbons, such as benzin or mineral oil, paraffins, chloroparaffins, fluorohydrocarbons, natural oils, such as groundnut oil or soybean oil, adhesives, aromas, perfume oils, monomers, such as acrylic or methacrylic acid esters, styrene or active ingredients, for example crop protection agents. Examples are in particular solutions or suspensions of dyes and especially of color formers and pigments in hydrocarbons, such as alkylnaphthalenes, partially hydrogenated terphenyl, dodecylbenzene and other high-boiling liquids or mixtures thereof.

Suitable starting materials for the wall material are melamine-formaldehyde precondensates and/or their ethers having a melamine:formaldehyde ratio of preferably from 1:3 to 1:6. These precondensates are N-methylolmelamine compounds or their ethers with alkanols. The precondensates used for the process according to the invention should be water-miscible in all proportions without turbidity. Any turbidity which appears on cooling down must be removable by heating. For these reasons, the ethers of the methylolmelamines are particularly preferred. The preparation of the starting materials is known.

Suitable water-soluble sulfo-containing polymers are for example homopolymers or copolymers of sulfoethyl (meth)acrylate, of sulfopropyl (meth)acrylate, of maleimide-N-ethanesulfonic acid or 2-acrylamido-2-methylpropanesulfonic acid. Preference is given to polymers of 2-acrylamido-2-methylpropanesulfonic acid, which can easily be polymerized to polymers having the desired K values. The polymers are present in the form of the free acid or preferably as alkali metal or trisubstituted ammonium salts. Also suitable as sulfo-containing polymers are copolymers which are composed of the sulfo-containing monomers mentioned or vinylsulfonic acid and $C_1$–$C_3$-alkyl acrylates, hydroxy-$C_2$–$C_4$-alkyl acrylates such as methyl, ethyl, n- or i-propyl acrylate, hydroxypropyl acrylate and/or N-vinylpyrrolidone. In the case of the acrylates, their proportion in the copolymer is at most 30% by weight. In the case of the hydroxyalkyl acrylates, their proportion should be no greater than 10% by weight, based on the total amount of comonomers. In the case of copolymers with N-vinylpyrrolidone, the proportion of sulfo-containing monomers is not less than 5, preferably 30, % by weight or higher (based on the total amount of comonomers). Of the copolymers, those having 2-acrylamido-2-methylpropanesulfonic acid ($H_2C=CH-CO-NH-C(CH_3)_2-CH_2-SO_3H$) as sulfo-containing comonomer are preferred. The sulfo-containing homopolymers and copolymers are prepared in a conventional manner.

The polymers should have a Fikenscher K value of from 100 to 170 (measured in aqueous solution) or a viscosity of from 200 to 5000 mPas for a shear gradient of 489 $s^{-1}$ (measured at 25° C. in 20% strength by weight aqueous solution at pH 4.0-7.0). Preference is given to polymers having a K value of from 115 to 160, the viscosity of which ranges from 400 to 4000 mPas.

The water-soluble sulfo-containing polymers are generally used in an amount of from 1 to 5.5, preferably from 1.5 to 4.5, % by weight, based on the aqueous phase.

The optimal amount of the water-soluble sulfo-containing polymers is affected on the one hand by the polymer itself and on the other by the reaction temperature, the desired microcapsule size and the precondensate of melamine and formaldehyde. The optimal amount required can be easily determined by simple serial experiments. We have found that the optimal concentration of the water-soluble sulfo-containing polymer is virtually independent of the ratio of the aqueous continuous phase to the organic, water-insoluble core material phase, so that, once the conditions have been optimized, microcapsule dispersions with variable capsule contents can be prepared to a virtually consistently high standard.

The further and full condensation of the precondensates during and after capsule formation is advantageously effected at pH 3.0-6.5, preferably pH 3.5-5.5. The pH of the aqueous phase can be set with acids, such as sulfuric acid, hydrochloric acid, nitric acid, phosphoric acid, oxalic acid or preferably formic acid, or in the case of an acid aqueous phase with sodium hydroxide solution. The onset of turbidity, i.e. the precipitation of the melamine-formaldehyde condensate, depends somewhat on the precondensate, so that the formation of microcapsules from different precondensates has somewhat different optimal pH and/or temperature conditions.

In general, the process according to the invention is advantageously carried out at 15°-100° C. preferably 40°-90° C., to obtain more rapid microcapsule formation.

The further condensation of the precondensate can be effected within the range of the abovementioned pH values and temperatures in the absence but also in the presence of the water-soluble sulfo-containing high polymer. The latter opinion in the further condensation is preferable, since the condensate particles which precipitate from the aqueous solution and are responsible for the turbidity are then or more uniform size.

The hydrophobic material to be encapsulated, for example the water-soluble liquid, can either be added after the appearance of turbidity or be present during the further condensation of the precondensate.

The present invention makes it possible to prepare microcapsules of various diameters. For instance, the capsules generally become smaller on increasing the amount of precondensate and/or hydrophilic protective colloid (i.e. the sulfo-containing polymers) used and/or the intensity of dispersion and/or the residence time in the dispersing stage. Larger capsules can correspondingly be obtained by applying the measures, individually or combined, the other way around. The degree to which the precondensate is further condensed has a bearing on the capsule size: at its optimum, the capsules obtained under otherwise constant conditions are very small. In general, capsules having diameters of from 1 to 200 μm, in particular from 2 to 50 82, are prepared. The latter range is particularly advantageous, for example, in the preparation of reactive carbonless copy papers.

The continuous process according to the invention is particularly suitable for preparing the capsules described in European Pat. No. 26,914.

Compared with the description in said European Pat. No. 26,914 at the top of page 6, the present invention makes it possible, when the melamine-formaldehyde precondensate has been further condensed to the correct degree, to manage with no more than one pass through a continuous dispersing stage.

The capsules obtained by the process according to the invention may contain residual free formaldehyde which may be undesirable in the further processing. The residual formaldehyde can be bonded by adding for example from 10 to 100% by weight, calculated on the precondensate used, of urea and/or ethyleneurea and/or melamine and/or ammonia and/or sodium bisulfite at 20°-100° C. and pH 3-10. Advantageously the formaldehyde is removed immediately after the full condensation or curing stage where the formaldehyde is evolved.

The process according to the invention will be illustrated in more detail by the examples below. In what follows, parts and percentages are by weight, more particularly the percentages being by weight of solution or dispersion. Parts by volume correspond to parts by weight of density 1.

The solid contents quoted in the Examples are determined by drying (4 hours at 105° C.), and are substantially composed of the microcapsules and the water-soluble polymer. The sieve residue is determined by sieving the dispersion through a 40 μm mesh size vibrating screen and weighed while moist. In that state it contains about 50% of water. The capsule diameter is determined subjectively under the microscope and objectively by means of the Coulter-Counter. The variables quoted are the capsule diameter in μm for the most frequent particle size (number average) and for the particle fraction having the largest total volume (volume average) and also the half-value width of the volume average as the capsule diameter or the capsule diameter difference (HW) which the differential distribution curve shows at a frequency of 50%.

The viscosity of the capsule dispersion is quoted as the efflux time in seconds of 100 ml of dispersion from the DIN cup with a 4 mm nozzle. The viscosity of the 20% strength solutions of the water-soluble polymers containing strongly acid groups, for example sulfo groups, is measured in a Rheomat ® 30 (from Contraves) at 25° C. in a shear gradient of 489 $sec^{-1}$. The K value is determined by the method of Fikentscher (Cellulosechemie 13 (1932), 58 ff) for a 1% concentration in water.

The microcapsules obtained in the examples are tested for tightness and for intensity of copy as follows:

I. Test for tightness and intensity of copy (a) The microcapsule dispersion is diluted with water to 20% and then doctor-coated in 30 μm thickness onto a sheet coated with active clay (CF sheet) of a reactive carbonless copy paper, and the paper is dried in air for 2 hours (about 5 g of capsules/m² of paper surface). β) 8.25 parts of the 40% strength capsule dispersion are mixed by stirring in succession with 11.75 parts of water,
1.30 parts of a 50% strength commercially available binder dispersion based on a copolymer of styrene and butyl acrylate and
1.30 parts of ground cellulose as spacer (Arbocel® B 600/50 from J. Rettenmaier & Söhne, 7091 Holzmühle, West Germany)

and the mixture is than applied by hand with a spiral-wire doctor blade with a 10-30 μm gap to a coating paper of 44 g/m² in weight in such a way that the coating has a weight of about 7.5 g/m² 30 min after application and drying in air.

(a) Tightness

Testing the microcapsules applied to the CF sheet as per (α) produces, after drying, a certain, small amount of staining of the clay on the paper, for which non-encapsulated color former solution is responsible. Any color former outside the microcapsules can be immediately converted into the dye on the CF sheet by spraying the capsule-coated paper with, for example, dodecylbenzene, and drying. The color on the CF sheets thus treated is measured as the difference from the reflectance of the unsprayed sheet in a reflectance photometer (ELREPHO® from Zeiss) and quoted in relative % units, the reflectance of the unsprayed sheet being set equal to 100. The color measured is designated ICF and quoted in %.

(b) Intensity of copy

The sheet coated as per (β) is placed with the coated face on a CF sheet, and 2 sheets of approximately 40 g/m² paper are placed on top. This pile is inserted into an electric typewriter, and the letter small w is typed with maximum impression a sufficient number of times to fill an area of $4.2 \times 3.4$ cm. After 30 min of storage, the intensity (ID) of the third copy obtained is determined as the difference between the reflectance of the untyped ($R_{yo}$) and of the typed ($R_{ym}$) CF sheet. The reflectance is measured with the reflectance photometer indicated under Ia, using filter Y, and is quoted in relative units (%): $ID = R_{yo} - R_{ym}$. The reflectance of the untyped white CF sheet is in general 88%.

II. Quick test for tightness (a) A sample of the capsule dispersion is diluted with water to about 20%, and this dilute dispersion is applied with a hair brush in a thin coat to a Merck DC aluminum foil coated with 60 F 254 silica gel. When the brushed-on coat has dried, the silica gel underneath the brushed-on coat is examined for discoloration due to color former solution outside the capsule, the degree of discoloration is rated (rated 1=colorless, white . . . ; rating 6=deeply discolored).

(b) Color former outside the capsule can be detected by placing a drop of dodecylbenzene on this brushed-on coat. Drying leaves a more or less pronounced discoloration, which is likewise rated.

EXAMPLE 1

1.1 A stock reservoir vessel $Z_1$ is charged with 80 parts of a color former mixture which, after development, gives a black hue, in 1520 parts of diisopropylnaphthalene. The 80 parts of color former mixture comprise 11.43 parts of 1-methyl-3-dibutylamino-5-diethylamino-2,4-diazarhodaminelactone (red), 25.71 parts of 2,6-diphenyl-4-(4'-dimethylaminophenyl)-pyridine (yellow), 28.57 parts of 3'-phenyl-7-N-diethyl-spirodibenzopyran (blue) and 14.28 parts of N-benzoyl-leucomethylene blue (cyan). In a spaced stock reservoir vessel $Z_2$ a solution is prepared from 320 parts of a 20% strength solution of a poly-2-acrylamido-2-methylpropanesulfonic acid (sodium salt, viscosity of the 20% strength solution 800 mPas; K value 124) in water, 1000 parts of water and 32 parts of 10% strength formic acid, and a third stock reservoir vessel $Z_3$ is charged with 241 parts of a partially methylated precondensate (contains about 2.3 $CH_3O$ groups per melamine molecule) of 1 mole of melamine and 5.25 moles of formaldehyde, which gives a clear solution in water, and 1143 parts of water. These stock reservoir vessels are emptied at a rate of 38 parts, 33 parts and 33 parts per minute, which corresponds to a total of 6240 parts per hour, into a reactor in which all three feeds are mixed.

The temperature in the reactor (about 90 parts by volume) is set to approximately 64° C. The mixture then passes into a dispersing unit (21 parts by volume), the speed of which is adjusted in such a way that droplets having a diameter of from 2 to 5 μm are formed. In the reactor, the precondensate starts to condense further at pH 4.4, and this further condensate stabilizes the emulsion obtained in the dispersing unit through dispersion of the hydrophobic phase, in the form of a microcapsule dispersion which is stable in the stirred state. The capsule dispersion is collected with stirring in a 2000 parts by volume capacity kettle which is externally heated to 65° C. The dispersion flowing into the stirred flask has a pH of 4.4. A sample of the dispersion, taken downstream of the dispersing unit and, after dilution to 10% as described in IIa, applied with a hair brush to a silica gel thin layer plate serving as developer, still gives a distinctly colored coat, i.e. the microcapsule walls are still not fully cured and tight. When the kettle contains 1500 parts by volume after 14.5 min, the capsule dispersion stream is collected in a further kettle. 15 min after discontinuing the flow into the first stirred flask, a coat of the dilute dispersion applied by brush to silica gel as per IIa is no longer colored. The capsule wall is tight. The content of the kettle is then maintained at 80° C. for 2 h, during which the resin becomes fully condensed. The dispersion, which has a pH of 5.0, is neutralized with triethanolamine and cooled down.

The dispersion is sieved through a sieve having a mesh width of 40 μm. 2 parts of moist sieve residue are left behind. The sieved dispersion has a solids content of 38.2% and a viscosity corresponding to a DIN cup efflux time of 22 sec. Under the microscope the microcapsules have a diameter of from 2 to 5 μm. Measurement in the Coulter-Counter shows the diameter of the most frequent particle to be 3.2 μm (number average) and the most frequent volume to be 4.8 μm (volume average) with a half-value width of HW=3.6 μm (i.e. diameter of 3.0-6.6 μm). The dispersion smells somewhat of formaldehyde.

The microcapsule dispersion obtained is tested for tightness and intensity of copy in accordance with I:

The tightness test as per Ia gives an ICF value of 2%, and the intensity test as per Ib an ID value of 48%.

1.2 200 parts of the dispersion obtained as per 1.1 are rapidly brought with ammonia to pH 9.5. After 2-3 h, a pH of 7.5 has become established. The dispersion no longer smells of formaldehyde. The results of the tightness and intensity tests are virtually the same as for the dispersion of 1.1.

1.3 To 200 parts of the dispersion prepared in 1.1 are added 7.0 parts of ethyleneurea, previously dissolved in 10.5 parts of water. The mixture is stirred for 12 h. The odor of formaldehyde has then dispersed. The results of the tests for tightness and intensity of copy are practically identical to those of dispersion 1.1.

EXAMPLE 2

Example 1 is repeated, except for the following difference: the addition of the 3 feeds is raised to a total of 7920 parts by volume/hour without changing the relative amounts. The temperature in the reactor is 65° C., and the pH at the outlet of the dispersing apparatus is 4.4. The temperature in the batchwise complete condensation kettle is 66° C. 13 min after filling the stirred vessel, the capsules are tight, to judge by a brushed-on coat of a dilute (10%) dispersion on silica gel (in accordance with IIa). The capsules are fully condensed after stirring at 66° C. for 3 h. The dispersion obtained has a pH of 5.0, and is neutralized with triethanolamine and cooled down.

The dispersion obtained has a solids content of 40.7% and a viscosity corresponding to a DIN cup efflux time of 25.1 sec. Sieving through a 40 $\mu$m mesh leaves a moist residue of 5 parts.

The capsule diameter is found under the microscope to be 2-5 $\mu$m, while the Coulter-Counter gives 3.0 $\mu$m as the number and 4.5 $\mu$m as the weight average, the latter with a half-value width of 3.9-7.7 $\mu$m.

The tightness test according to Ia gives and ICF value of 2% and a copy intensity according to Ib of ID=45%.

EXAMPLE 3

Example 1 is repeated with a total feed of 10,500 parts by volume/hour and a temperature in the prereactor of 65° C. The batchwise condensation to completion is carried out at 70° C. The inflowing dispersion has a pH of 4.4. 13 min after filling the stirred kettle the capsules are tight, judging by a brushed-on coat on silica gel. The dispersion is stirred at the same temperature for a further 2.4 h, during which the capsule walls are condensed to completion. The pH rises to 4.9. The dispersion is then neutralized with triethanolamine to pH 7.5 and cooled down.

After sieving through a 40 $\mu$m mesh sieve (3 parts of moist residue), the capsule dispersion has a solids content of 38.9% and a DIN cup efflux time of 22.5 sec. Under the microscope the capsules have a diameter of from 2 to 6 $\mu$m, while the Coulter-Counter gives 3.1 $\mu$m as the number average and 4.9 $\mu$m as the volume average, with a half-value width of 3.1-8.6 $\mu$m.

The tightness test as per Ia gives an ICF value of 1%, and an intensity of copy test as per Ib gives and ID of 47%.

EXAMPLES 4 AND 5

In these Examples, the pH is raised, compared with Examples 1-3, to pH 5.0 by adding 14 parts of 10% strength formic acid to the protective colloid feed. The feed rate is 5300 parts by volume/h in Example 4 and 9400 parts by volume/h in Example 5. The temperature in the reactor is 80° C. in Example 4 and 75° C. in Example 5. In Example 4, the capsules are tight 48 min after the end of the feed, while in Example 5 they are still not completely tight after 28 min. Both dispersions are cured to completion after stirring for 2 h at 78° C. and 71° C. respectively. The following values are obtained:

TABLE 1

|  | Example 4 | Example 5 |
| --- | --- | --- |
| Sieve residue, parts 40 $\mu$m mesh width | 2 | 1 |
| Solids content | 41.2% | 42% |
| Particle diameter |  |  |
| Microscope | 2-5 $\mu$m | 3-15 $\mu$m |
| Number average | 3.2 $\mu$m | 3.4 $\mu$m |
| Volume average | 4.4 $\mu$m | 10.7 $\mu$m |
| Half-value width | 3.0-6.2 $\mu$m | 7.3-13.7 $\mu$m |
| ICF | 2% | 1% |
| ID | 49% | 55% |

EXAMPLES 6, 7 AND 8

The dispersions of Examples 6, 7 and 8 are prepared as described in Example 1, except that the speed of the dispersing unit is varied in order to set different capsule diameters. The differences in the preparative conditions and in the results can be seen from Table 2 below.

TABLE 2

|  | Example 6 | Example 7 | Example 8 |
| --- | --- | --- | --- |
| Formic acid - amount, parts | 2.0 | 2.0 | 2.0 |
| pH - inlet | 4.6 | 4.6 | 4.6 |
| Speed (rpm) | 6000 | 5000 | 4000 |
| Total throughput parts/h | 5300 | 5300 | 5300 |
| Temperature °C. - reactor | 70 | 69 | 70 |
| pH before condensation | 4.7 | 4.6 | 4.6 |
| Temperature of condensation °C. | 70 | 70 | 68 |
| Result: |  |  |  |
| Sieve residue, moist, parts | 3 | 1 | 1 |
| DIN cup sec | 30.0 | 35.1 | 33.3 |
| Solids content % | 39.7 | 43.0 | 42.8 |
| Particle diameter $\mu$m |  |  |  |
| Microscope | 2-5 | 2-6 | 3-8 |
| Number average | 3.5 | 3.7 | 5.3 |
| Volume average | 4.7 | 5.5 | 7.8 |
| Half-value width | 3.2-6.5 | 3.7-8.1 | 5.3-10.8 |
| ICF % | 1 | 3 | 2 |
| ID % | 49 | 52 | 54 |

EXAMPLE 9

Example 1 is repeated using $Z_1$ 1600 parts of the color former solution of Example 1, in $Z_2$ a solution of 400 parts of the 20% strength solution of the sodium salt of the poly-2-acrylamido-2-methylpropanesulfonic acid of Example 1, 1176 parts of water and 10 parts of 10% strength formic acid and in $Z_3$ a solution of 64.4 parts of a precondensate of 1 mole of melamine and 3.9 moles of formaldehyde, the methylol groups of which have been etherified with about 2.4 moles of methanol, in 828 parts of water. The three feed rates are set to 32 parts, 28 parts and 16 parts per minute, which corresponds to a total of 4560 parts per hour, and the mixture is heated in a reactor with stirring to 70° C., during which a pH of 5.1 becomes established. The mixture then passes into the dispersing apparatus, where the hydrophobic color former solution is dispersed into particles of a capsule size of from 3 to 7 $\mu$m, and the particles are coated with the further condensed precondensate. A microcapsule dispersion which is stable when stirred and has capsule diameters of 3–7 $\mu$m and a pH of 5.15 leaves the dispersing apparatus at 70° C. 1500 parts of the dispersion are collected at 70° C. in a batchwise stirred unit which is equipped with a propeller stirrer turning at 1500 rpm, and then a solution of 57.4 parts of the abovementioned melamine-formaldehyde precondensate in 75 parts of water is added in the course of one minute, during which the pH rises to 5.5. The dispersion is stirred at 70° C. After 2 hours the capsules are tight. A thin coat of a 1:1 dilution with water brushed onto a silica gel thin layer chromatography plate no longer shows discoloration of the silica gel. The dispersion is stirred at the same temperature for a further 1.5 hours, during which the condensate is condensed to completion, and is then neutralized and cooled down.

The dispersion formed has a viscosity corresponding to an efflux time of 35.6 sec, and a solids content of 38.2% after sieving, which left behind 2 parts of moist sieve residue. The capsule diameter is an unchanged 3-7 μm, according to evaluation under the microscope.

The tightness test as per Ia gives and ICF value of 2%, and the black copy as per Ib has an intensity of ID=50%.

COMPARISON EXAMPLE

Example 1 is repeated, except for the following differences:

$Z_1$ is charged with 530 parts of the color former solution of Example 1, $Z_2$ with a solution of 106 parts of a 20% strength solution of the sodium salt of a polyacrylic acid (viscosity of the 20% strength solution: 1348 mPas, K value: 133.5, pH 7.0), 658 parts of water and 30 parts of a 10% strength formic acid solution, and $Z_3$ with a solution of 152 parts of the melamine-formaldehyde precondensate used in Example 1 and 612 parts of water. The feeds are metered into the reactor at rates of 23, 33 and 33 parts per minute, which corresponds to a total feed of 5340 parts by volume per hour.

The reactor temperature is 60° C., and the pH is 4.8. The dispersing stage (6000 rpm) produces a dispersion of primary capsules which are 2-4 μm in diameter. Most of the capsules are present as agglomerates up to 20 μm in size. 1000 parts of the viscous dispersion are collected in a stirred flask equipped with a horseshoe stirrer, and the wall material is cured in 3 h at 78° C. and pH 5.4.

The dispersion thus cured is made up almost exclusively of capsule agglomerates, their solids content is 26.9%, and the viscosity corresponds to a DIN cup efflux time of 41 sec. The quick test as per IIa and b gives the ratings 5 and 6. The capsules are not tight, color former and solution being present outside the capsules.

After about ½ hour of operation, sizeable lumps made up of agglomerates begin to form in the reactor. After a further hour the apparatus has to be switched off.

Comparative Experiment 1 shows that this process is not suitable for microencapsulating with melamine-formaldehyde precondensates in the presence of protective colloids comprising water-soluble polymers with weakly acid groups. The turbulent flow the process stages here gives rise to the agglomerates already described in European Laid-Open Application No. 82,635.

COMPARATIVE EXAMPLE 2

Comparative Example 1 is repeated, except for the following changes: $Z_1$ is charged with 1040 parts of the color former solution of Example 1, $Z_2$ with a solution of 36 parts of the Na salt of a polyacrylic acid (K value 20-30, molecular weight 70,000-90,000), 101.3 parts of the Na salt of a polyacrylic acid (K value 10-14, molecular weight about 5000), 35 parts of a 10% strength formic acid and 870.7 parts of water, and $Z_3$ with a solution of 229 parts of the melamine-formaldehyde precondensate of Example 1 in 879 parts of water. The feed rates into the reactor are 30, 25 and 25 parts/min, which corresponds to a total feed into the continuous encapsulation process of 5000 parts per hour. The temperature and the pH do not differ from Comparative Example 1.

After about 30 min the dispersion begins to flocculate in the reactor stage. The dispersion leaving the dispersing stage is agglomerated and flocculant. The experiment is discontinued, since it is impossible to obtain individual capsules.

The combination of the two polyacrylic acids of this comparative experiment corresponds in amount and molecular weight to the ethylene/acrylic acid copolymers of European Laid-Open Application No. 82,635 in the published example.

The Comparative Example shows that the feed substances described in European Laid-Open Application No. 82,635 are not usable for the purposes of the invention.

EXAMPLE 10

Apparatus as described in Example 1 is used, except for the change that the capsule dispersion leaving the dispersing stage passes continuously through a kettle cascade. First the dispersion enters three 1000 parts by volume capacity stirred kettles in succession, in each case at the bottom end, and leaves at the top via an overflow. The dispersion then passes through a stirred kettle of 4000 parts by volume capacity and a further stirred kettle of 1000 parts by volume capacity. The first four kettles are heated to 69° C., while the last kettle serves to cool the fully cured capsule dispersion.

$Z_1$ is charged with 6900 parts of the color former solution used in Example 1, $Z_2$ with a solution of 1920 parts of a 20.1% strength solution of the potassium salt of a poly(3-sulfopropyl)methacrylic acid ester (viscosity of the 20% strength solution at room temperature: 725 mPas; K value 138.9) in water, 6000 parts of water and 20 parts of 100% strength formic acid, and $Z_3$ with a solution of 2064 parts of the melamine-formaldehyde precondensate used in Example 1 in 6240 parts of water. The three feeds are set to 32, 28 and 28 parts by volume per minute, which corresponds to a total of 5280 parts per hour, and subjected to further condensation and dispersing. The temperature in the reactor and in the dispersing stage is 69° C. The capsule dispersion entering the kettle cascade has a pH of 4.7. The capsule dispersion leaving the kettle cascade after a total of 1.5 hours has a pH of 5.3 and is neutralized with treithanolamine.

The dispersion has a solids content of 39.0% and a viscosity corresponding to a DIN cup efflux time of 45 sec. Under the microscope the microcapsules have a diameter of 2-5 μm. In a Coulter-Counter the diameter of the most frequent volume is found to be 5.5 μm with a half-value width of HW=3.1 μm.

In the quick test for tightness, both IIa and IIb give a rating of 1-2 (almost colorless).

The tightness according to Ia is ICF=6%, and the intensity of the black copy ID=49%.

EXAMPLE 11

Stock reservoir vessel $Z_1$ is charged with 9600 parts of the color former solution of Example 1. Stock reservoir vessel $Z_2$ is charged with a solution of 1920 parts of a 20% strength solution of the sodium salt of a poly-2-acrylamido-2-methylpropanesulfonic acid as described in Example 1, 6000 parts of water and 70 parts of 100% strength formic acid, and stock reservoir vessel $Z_3$ with a solution of 1445 parts of the partially methylated melamine-formaldehyde precondensate, which gives a clear solution in water and is as described in Example 1, and 6859 parts of water. Stock reservoir vessels $Z_2$ and $Z_3$ are each discharged at a rate of 14 ml/min into the prereactor (310 ml capacity). The prereactor is stirred, and the precipitate is maintained at 35° C. The pH of the mixture is 3.8. When the prereactor is full, first the corresponding dispersion is discharged into a waste container until the turbidity, or light transmittance, of the reactor charge has stabilized at 95%. The mixture leaving the reactor is then metered together with 16 ml/min of the color former mixture from $Z_1$ directly into the dispersing unit. The speed of the stirrer of the dispersing unit is adjusted in such a way as to produce a dispersion of capsules of from 3 to 10 μm in diameter (evaluated under the microscope). The capsule dispersion leaving the disperser is passed in accordance with Example 10 through three 1000 ml capacity stirred kettles and maintained at 80° C. The dispersion then has a pH of 3.8. It is cooled and neutralized with triethanolamine to pH 7.5.

500 parts of the dispersion are sieved through a 40 μm mesh sieve, leaving 2 g of a moist residue on the sieve. The solids content of the dispersion is then 40.1% and the efflux time from the DIN cup is 19.5 sec. Under the microscope, the capsule diameter is found to be from 3 to 10 μm.

The tightness test as per Ia gives an ICF value of 4%, and the intensity test as per Ib gives an ID value of 51%.

I claim:

1. A continuous process for preparing microcapsules encapsulating a hydrophobic material, said microcapsules having melamine-formaldehyde condensate capsule walls, which process comprises condensing a water-soluble melamine-formaldehyde precondensate which is water-miscible in all proportions without turbidity from an initial aqueous solution, comprising said precondensate, said hydrophobic material and 1–5.5%, by weight, based on the aqueous phase, water soluble high polymers containing strongly acid groups, continuing said condensation of said precondensate until said aqueous solution starts to become turbid, dispersing the hydrophobic material to be encapsulated in the aqueous dispersion resulting from said initial condensation step, and subsequently completing condensation of said melamine-formaldehyde condensate to form the wall material of the resulting microcapsules, wherein the microcapsules are prepared in a pH 3–6.5 and 15°–100° C.

2. A process as claimed in claim 1, wherein the water-soluble high polymer containing strongly acid groups is a sulfo-containing homopolymer or copolymer of sulfoethyl (meth)acrylate, sulfopropyl (meth)acrylate, of maleimide-N-ethanolsulfonic acid of 2-acrylamido-2-methylpropanesulfonic acid.

3. A process as claimed in claim 1, wherein the water-soluble high polymer containing strongly acid groups is a homopolymer or copolymer of 2-acrylamido-2-methylpropane-sulfonic acid.

4. A process as claimed in claim 3, wherein the microcapsules are prepared at pH 3.5–5.5.

5. A process as claimed in claim 1, wherein the melamine-formaldehyde precondensate is condensed further in the presence of the water-soluble high polymer having strongly acid groups.

6. A process as claimed in claim 1, wherein the microcapsules are prepared at pH 3.5–5.5.

7. A process as claimed in claim 1, wherein the water-soluble melamine-formaldehyde precondensate is a reaction product of melamine with formaldehyde in a molar ratio of from 1:3 to 1:6.

8. A process as claimed in claim 7, wherein the water-soluble high polymer containing strongly acid groups is a sulfo-containing homopolymer or copolymer of sulfoethyl (meth)acrylate, sulfopropyl (meth)acrylate, of maleimide-N-ethanolsulfonic acid or of 2-acrylamido-2-methylpropane-sulfonic acid.

9. A process as claimed in claim 7, wherein the water-soluble high polymer containing strongly acid groups is a homopolymer or copolymer of 2-acrylamido-2-methylpropanesulfonic acid.

10. A process as claimed in claim 7, wherein the water-soluble melamine-formaldehyde precondensate has been etherified with an alkanol.

11. A process as claimed in claim 10, wherein the water-soluble high polymer containing strongly acid groups is a sulfo-containing homopolymer or copolymer of sulfoethyl (meth)acrylate, sulfopropyl (meth)acrylate, of maleimide-N-ethanolsulfonic acid or of 2-acrylamido-2-methylpropanesulfonic acid.

12. A process as claimed in claim 10, wherein the water-soluble high polymer containing strongly acid groups is a homopolymer or copolymer of 2-acrylamido-2-methylpropanesulfonic acid.

13. A process as claimed in claim 10, wherein the microcapsules are prepared at pH 3.5–5.5.

* * * * *